(12) United States Patent  
Tsai et al.

(10) Patent No.: US 8,959,397 B2  
(45) Date of Patent: Feb. 17, 2015

(54) COMPUTER-ON-MODULE DEBUG CARD ASSEMBLY AND A CONTROL SYSTEM THEREOF

(71) Applicant: Portwell Inc., New Taipei (TW)

(72) Inventors: Ming-Hsin Tsai, New Taipei (TW); Chia-Hsien Wang, New Taipei (TW)

(73) Assignee: Portwell Inc., New Taipei (TW)

( * ) Notice: Subject to any disclaimer, the term of this patent is extended or adjusted under 35 U.S.C. 154(b) by 84 days.

(21) Appl. No.: 13/838,910

(22) Filed: Mar. 15, 2013

(65) Prior Publication Data

US 2014/0281718 A1 Sep. 18, 2014

(51) Int. Cl.  
 *G06F 11/00* (2006.01)  
 *G06F 11/27* (2006.01)

(52) U.S. Cl.  
 CPC ....................................... *G06F 11/27* (2013.01)  
 USPC ................................................ 714/30; 714/27

(58) Field of Classification Search  
 CPC ............ G06F 11/2205; G06F 11/2294; G06F 11/273; G06F 11/2733; G06F 11/3648; G06F 11/3656  
 USPC ........................ 714/27, 30, 31, 46; 324/750.3  
 See application file for complete search history.

(56) References Cited

U.S. PATENT DOCUMENTS

| | | | | |
|---|---|---|---|---|
| 6,738,930 B1* | 5/2004 | Medin et al. | ...................... | 714/30 |
| 7,882,395 B2* | 2/2011 | Hsu | ................... | 714/31 |
| 8,751,710 B2* | 6/2014 | Fowler | ............................ | 710/72 |
| 2003/0235156 A1* | 12/2003 | Gygi et al. | ..................... | 370/241 |
| 2005/0193251 A1* | 9/2005 | Chuang et al. | ................... | 714/29 |
| 2005/0289274 A1* | 12/2005 | Ghercioiu et al. | ............ | 710/303 |
| 2008/0126632 A1* | 5/2008 | Baier et al. | ...................... | 710/100 |
| 2008/0133961 A1* | 6/2008 | Kao et al. | ........................... | 714/3 |
| 2008/0294939 A1* | 11/2008 | Kong | ................................ | 714/37 |
| 2010/0128432 A1* | 5/2010 | Miller | ...................... | 361/679.54 |
| 2012/0106070 A1* | 5/2012 | Landon | .................... | 361/679.47 |
| 2012/0274349 A1 | 11/2012 | Hu et al. | | |
| 2012/0304018 A1* | 11/2012 | Pan et al. | ......................... | 714/45 |
| 2013/0268708 A1* | 10/2013 | Huang et al. | .................. | 710/301 |
| 2013/0301202 A1* | 11/2013 | Fowler | ..................... | 361/679.21 |
| 2013/0326280 A1* | 12/2013 | Dong et al. | ..................... | 714/43 |
| 2014/0184254 A1* | 7/2014 | Tian et al. | .................. | 324/750.3 |

FOREIGN PATENT DOCUMENTS

CN 102760089 (A) 10/2012

* cited by examiner

*Primary Examiner* — Marc Duncan  
(74) *Attorney, Agent, or Firm* — Muncy, Geissler, Olds & Lowe, P.C.

(57) ABSTRACT

A computer-on-Module debug card assembly and a control system thereof comprising: a carrier module with a carrier board and electronic components thereon wherein the carrier board is provided with a plurality of I/O connectors and at least a bus; a debug module electrically connected to the carrier board and comprising a debug card and electronic components thereon wherein the debug card is equipped with a detecting component, at least a bus, and a plurality of switch buttons used to check switching; a COM express system electrically connected to the debug card and comprising a COM express board and electronic components thereon wherein the COM express board is provided with modular components and at least a bus. As such, it is able to identify messages for a CPU-bearing COM express board and a carrier board in the COM express system during debugging, streamlining the procedure and saving time.

17 Claims, 5 Drawing Sheets

COMPUTER-ON-MODULE DEBUG CARD ASSEMBLY AND A CONTROL SYSTEM THEREOF

BACKGROUND OF THE INVENTION

1. Field of the Invention

The present invention relates to a debug card assembly, particularly a Computer-on-Module debug card assembly and a control system thereof which is capable of identifying troubles with respect to a CPU-bearing COM (Computer-on-Module) express board and a carrier board and is in favor of remote control, serviceability and efficiency.

2. Description of the Related Art

In order to fulfill flexible design of industrial computers and shorter lead time for development of one product, manufacturers are gradually receiving the concept of modular design, for instance, COM Express (Computer-On-Module Express) as one design specification presented by the PCI (Peripheral Component Interconnect) Industrial Computer Manufacturers Group (PICMG) is one part of SOM (System-On-Module) and classified into two portions, (a) module with components such as CPU (Central Processing Unit), memory, and chipset necessary for operation of one system and (b) carrier board with other components such as I/O (Input/Output) connector, both of which are coordinated to become an end product based on customized demands and distinct functionality. As such, an existing module with multiple carrier boards combined conforms to various demands in different applications including game, recreation, safety, monitoring, medical treatment, measurement, test, etc.

An ordinary mass-produced computer needs to be tested for successful operation or booting of the computer. For example, the Power on Self Test (POST) of a computer system during initialization of CPU based on the Basic Input and Output System (BIOS) runs POST codes to check functionality of all main components including CPU, memory (RAM), graphic card, etc. In the course of tests, messages with respect to POST codes will be saved in the address of I/O Port 80H by BIOS and any messages during debugging are received and decoded by a tester via a debug card's buses linking a motherboard, e.g., ISA (Industrial Standard Architecture), PCI or LPC (Low Pin Count), and indicated on a display module of the debug card by which the tester comprehends test results. The techniques for a debug card have been disclosed in R.O.C. patents, e.g., M422100, M342545, and 200947198.

The conventional techniques based on a debug card to retrieve messages during debugging are mostly applicable to a traditional computer system rather than a COM Express system. For example, a conventional debug card which fails to identify a computer's troubles for a COM express board, design of one carrier, or one device but costs lots of manpower and resources in maintenance is referred to as an unideal design; moreover, the conventional debug card which is restricted to its location is inaccessible immediately via web-based remote control and needs to be corrected. Accordingly, the drawbacks of a conventional debug card deserve to be studied and overcome by the persons skilled in the art.

Accordingly, the inventor, who considered drawbacks and imperfect structural design of the prior art for a conventional debug card, e.g., a COM Express system not remotely controlled or immediately debugged, and attempted to optimize a solution, has developed the present invention a Computer-on-Module debug card assembly and a control system thereof which is based on a COM Express system for effective debugging, real-time web-based remote control, and promoted development of the industry.

SUMMARY OF THE INVENTION

The object of the present invention is to provide a Computer-on-Module debug card assembly and a control system thereof which is capable of identifying messages for the CPU-bearing COM express board and the carrier board in the COM express module during debugging, streamlining the procedure, saving time, and promoting manufacture efficiency, troubleshooting, and service quality.

The other object of the present invention is to provide a Computer-on-Module debug card assembly and a control system thereof which is provided with a web-based user interface in favor of remote control and real-time debugging and facilitates serviceability and efficiency.

The present invention is based on the following technical measures to realize the above purposes: a host which comprises a carrier module with a carrier board and electronic components thereon wherein the carrier board is provided with a plurality of I/O connectors and at least a bus; a debug module which is electrically connected to the carrier board and comprises a debug card and electronic components thereon wherein the debug card is provided with a detecting component, at least a bus, and a plurality of switch buttons used to check switching; a COM express module which is electrically connected to the debug card and comprises a COM express board and electronic components thereon wherein the COM express board is provided with modular components and at least a bus; the debug card is electrically connected between the carrier board and the COM express board.

The present invention is further based on technical measures comprising a host with at least a debug module which is provided with a plurality of switch buttons and electrically connected to a critical signal switch, an external VGA (Video Graphics Array), and an external power supply wherein the critical signal switch is used to control the switch buttons on the debug card.

For technical features and effects in terms of the present disclosure completely comprehended and recognized, the preferred embodiments and accompanying drawings are thoroughly described hereinafter.

DETAILED DESCRIPTION OF THE PREFERRED EMBODIMENTS

Figure 1:
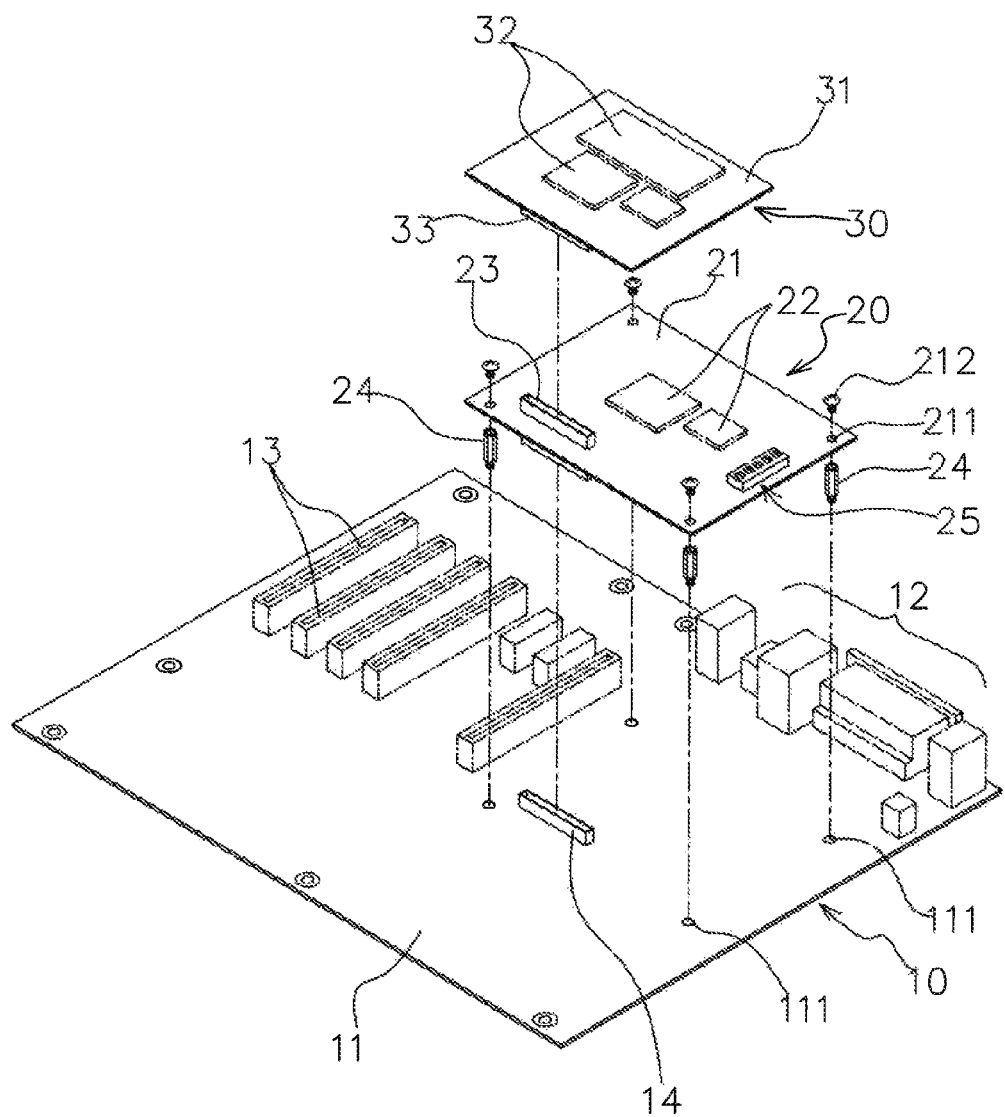
FIG. 1 is a schematic exploded view of the present invention.
Figure 2:
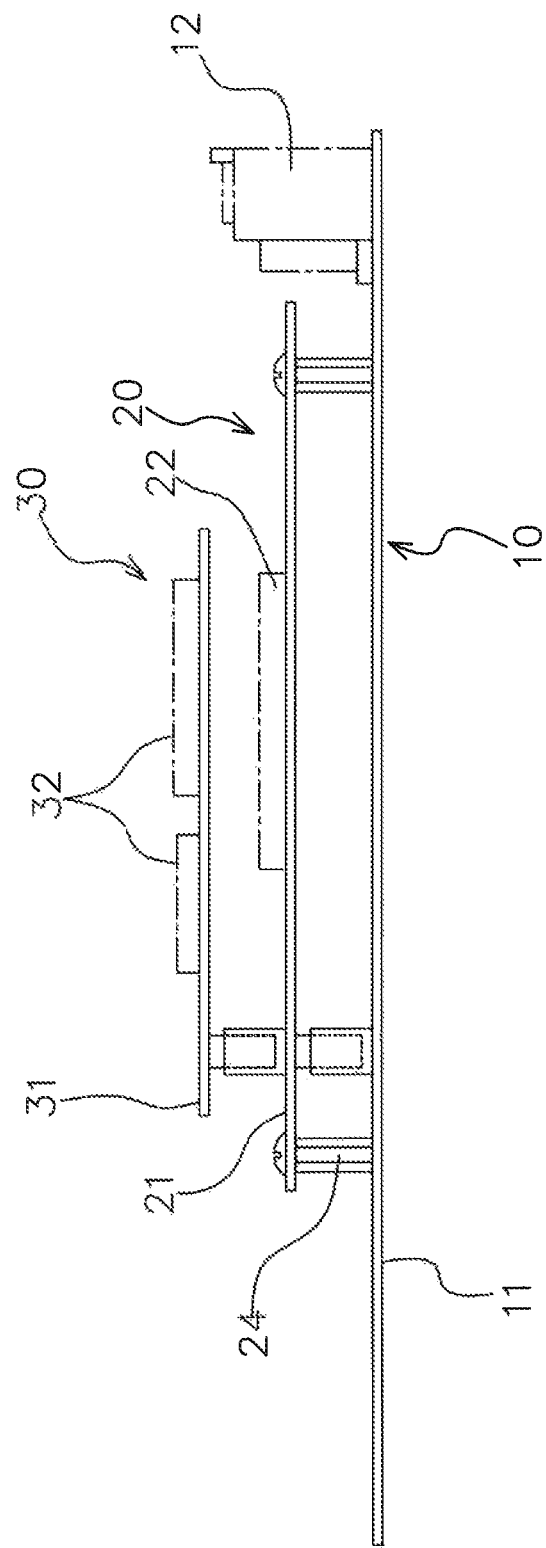
FIG. 2 is a schematic side view illustrating the present invention which is assembled.

Referring to FIGS. 1 and 2 which illustrate the present invention of a Computer-on-Module debug card assembly used in a COM Express system comprises a carrier module 10, a debug module 20 and a COM express module 30. The carrier module 10 comprises a carrier board 11 and electronic components thereon: the carrier board 11 is one printed circuit board on which a plurality of I/O connectors 12 and buses 13, 14 are installed wherein the bus 13 and the bus 14 can be chosen as but not limited to a PCI (Peripheral Component Interconnect) interface and a LPC (Low Pin Count) interface bus, respectively; the carrier board 11 has a plurality of pilot holes (or screw holes) 111. The debug module 20 comprises a debug card 21 and electronic components thereon: the debug card 21 is one printed circuit board on which a detecting component 22 and at least a bus 23 are installed: the bus 23 can be chosen as but not limited to a LPC interface bus which is connected to the bus 14; the debug card 21 also has a plurality of pilot holes 211. The pilot holes 111, 211 are designed to have support pins 24 in between through which the debug card 21 and the carrier board 11 thereunder (as of the positions shown in FIGS. 1 and 2) are coupled to each other with screws 212; the debug card 21 is also provided with a plurality of switch buttons 25 which are used to check switching. The COM express module 30 comprises a COM express board 31 and electronic components thereon: the COM express board 31 is one printed circuit board comprising (a) modular components 32 such as CPU, chipset and memory and (b) at least a bus 33 which can be chosen as but not limited to a LPC interface bus connected to the bus 23.

During development of the present invention of a Computer-on-Module debug card assembly, the debug module 20 is installed and connected between the carrier module 10 and the COM express module 30, that is, the debug card 21 allows its top surface to be connected to the COM express board 31 and its bottom surface to be connected to the carrier board 11, so that compatibility between the COM express module 30 and the carrier module 10 is diagnosed with the switch buttons 25 on the debug card 21 changed over, for instance, compatibility based on control signals between the COM express board 31 and I/O connectors 12 of the carrier board 11.

Figure 3:
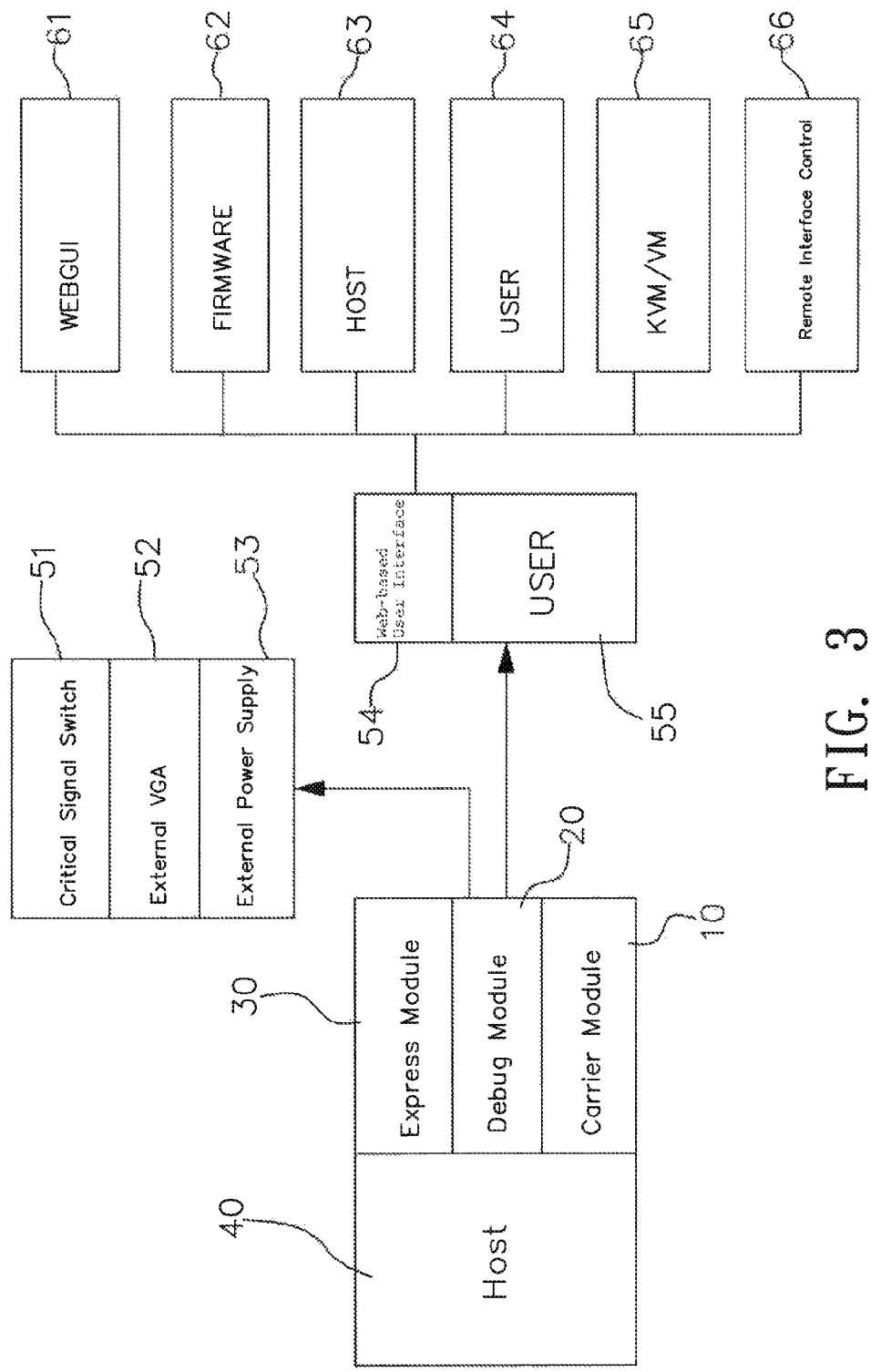
FIG. 3 is a schematic view illustrating a control system of the present invention.

Referring to FIG. 3 that illustrates the present invention of a Computer-on-Module debug card control system in which a host 40 comprises the carrier module 10, the debug module 20 and the COM express module 30. The debug module 20 links a critical signal switch 51, an external VGA 52 and an external power supply 53: the critical signal switch 51 is used in controlling a plurality of switch buttons 25 on the debug card 21 (debug module 20) and enabling/disabling signals on the debug card 21 such as PEG (PCI Express Graphic), PCIE (Peripheral Component Interconnect Express), LPC, S3, S4, S5 (S3, S4, S5 are the important signals of power sequence in system boot), RESET and PWRBTN (power button), all of which are sent to the carrier board 11 (carrier module 10) for diagnosing any system trouble of the host 40, e.g., the system which is normal (abnormal) with the signal of PCIE disabled (enabled) should be attributed to some components communicated with the signal of PCIE; the external VGA 52 which is referred to as an extra VGA interface during debugging is additionally offered to the host 40 in trouble by the debug module 20 (debug card 21); the external power supply 53 directly brings the debug module 20 (debug card 21) electricity to identify any trouble with respect to circuits of the carrier board 11 (carrier module 10) for power.

Moreover, the debug module 20 is further provided with a web-based user interface 54 and a user terminal system (USER) 55 through which a user remotely accesses the host 40 and the web-based user interface 54 of the debug module 20 and enables debug functions via networks.

Figure 4:
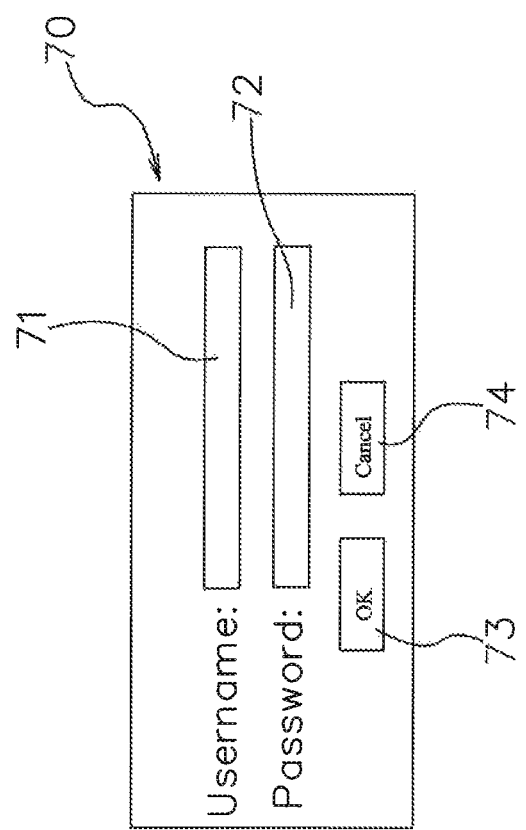
FIG. 4 is a schematic view illustrating an identity verification interface of the present invention.

Referring to FIG. 4 which illustrates the user terminal system (USER) 55 comprises an identity verification interface 70 with multiple fields such as Username 71, Password 72, OK 73 and Cancel 74 by which a user enters correct personal information into fields of Username 71 and Password 72 and is identified by the user terminal system (USER) 55 prior to accessing debug functions via the web-based user interface 54. As such, the host 40 is able to ensure its security and privacy.

Figure 5:
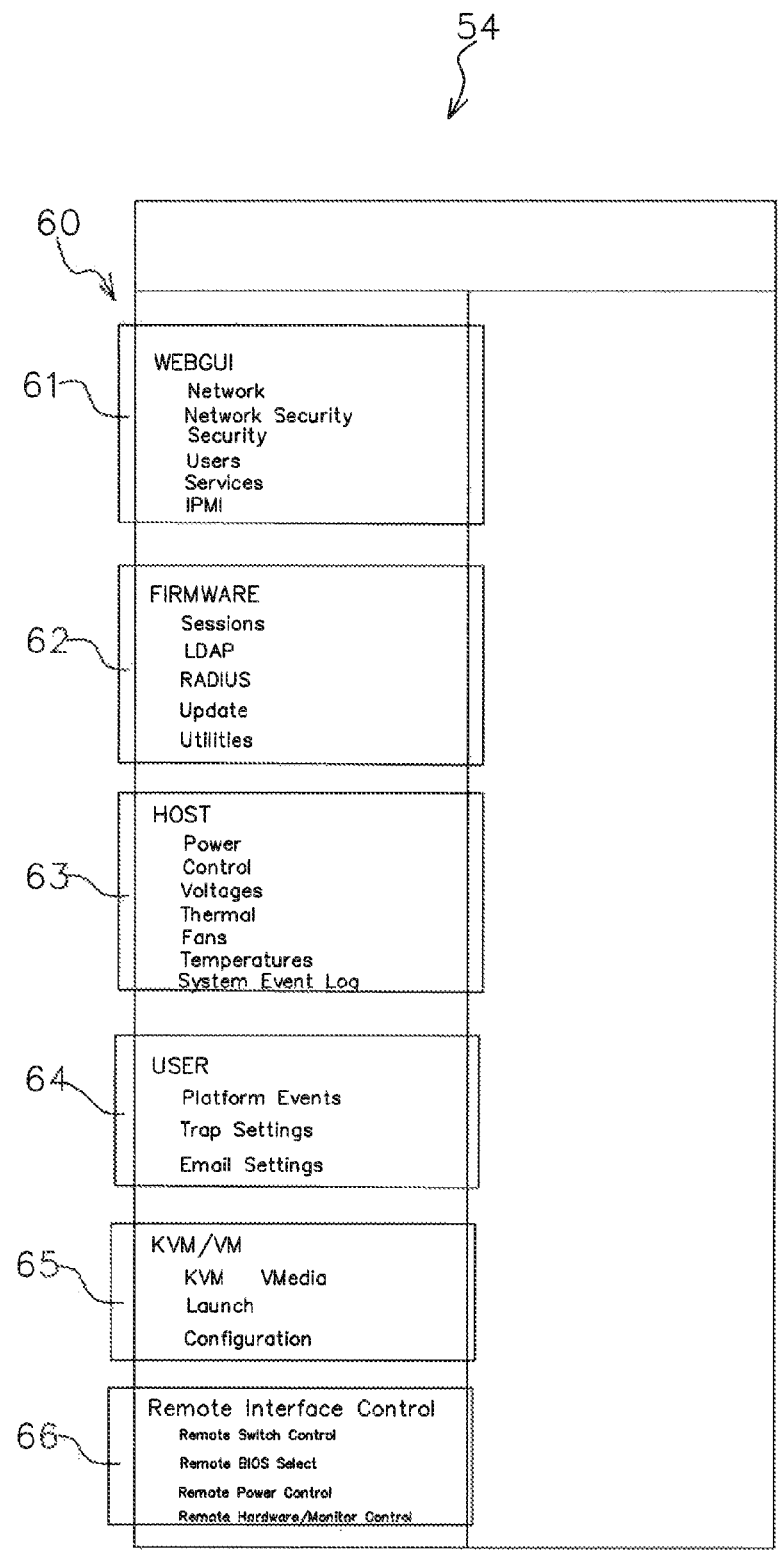
FIG. 5 is a schematic view illustrating a control interface installed on a web-based user interface of the present invention.

Referring to FIG. 5 which illustrates the web-based user interface 54 is provided with a control interface 60 used in executing interface controls and comprising at least one of interfaces as follows: WEBGUI (WEB Graphic User Interface) 61, firmware interface 62, host interface 63, user interface 64, KVM/VM (Keyboard Video Mouse switch/Visual. Media) interface 65, and remote interface control interface 66. Among these interfaces, the WEBGUI 61 comprises at least one of interfaces for network management as follows: network interface, network security interface, security interface, users interface, services interface and IPMI (Intelligent Platform Management Interface).

The firmware interface 62 comprises at least one of interfaces for firmware configurations as follows: sessions interface, LDAP (Lightweight Directory Access Protocol) interface, RADIUS (Remote Authentication Dial in User Service) interface, update interface and utilities interface.

The host interface 63 is used in configuring server information and comprises at least one of interfaces for system information as follows: power (with control and voltages included) interface, thermal (with fans and temperatures included) interface and system event log interface.

The user interface 64 is used in configuring event management at a user terminal and comprises at least one of interfaces as follows: platform events interface, trap settings interface, and email settings interface.

The KVM/VM interface 65 is used in configuring Serial Over LAN (local area network) and comprises at least one of functions as follows: KVM, VMedia, Launch, and Configuration wherein the KVM is used to remotely control the host 40 for various operations, e.g., debugging; and the VMedia is a USB device from which a debug program is remotely downloaded to the host 40 for debugging.

The Remote Interface Control 66 provides at least one of functions as follows: remote switch control, remote BIOS select, remote power control and remote hardware/monitor control wherein (a) the remote switch control as one method to identify any trouble of the host 40 can enable/disable signals on the COM express module 30 remotely such as PEG, PCIE, LPC, power sequence (including S3, S4 and S5), RESET, and PWRBTN to be transmitted to the carrier board 11, (b) the remote BIOS select is related to a BIOS SPT IC (BIOS Serial Peripheral Interface Integrated Circuit) on the debug module 20 and effective in remotely activating BIOS of the debug module 20 for booting in order to identify any trouble with respect to BIOS of the host 40, and (c) the remote power control is used in controlling operations of the host 40 remotely such as booting, shutdown and reset.

As such, the present invention of a Computer-on-Module debug card assembly and a system thereof is capable of identifying messages with respect to the CPU-bearing COM express board and the carrier board in the COM express module during debugging, streamlining the procedure, saving time, and promoting manufacture efficiency, troubleshooting, and service quality. Moreover, the present invention which is provided with a web-based user interface in favor of remote control and real-time debugging facilitates serviceability and efficiency.

Therefore, the present invention which is a superior innovative design significantly meets patentability and is applied for the patent. However, the above descriptions are only preferred embodiments which do not limit the scope of the present invention; any equivalent change or improvement without departing from spirit of the present invention should be incorporated in claims herein.

What is claimed is:

1. A Computer-on-Module debug card assembly with a host which further comprise:
   a carrier module comprising a carrier board and electronic components thereon wherein said carrier board is provided with a plurality of I/O connectors and at least a bus;
   a debug module which is electrically connected to said carrier board and comprises a debug card and electronic components thereon wherein said debug card is provided with a detecting component, at least a bus, and a plurality of switch buttons used to check switching;
   a COM express module which is electrically connected to said debug card and comprises a COM express board as well as electronic components thereon wherein said COM express board is provided with modular components and at least a bus;
   said debug card is electrically connected between said carrier board and said COM express board.

2. The Computer-on-Module debug card assembly according to claim 1 wherein said carrier board is provided with said buses such as at least an LPC interface bus; and
   said COM express board is equipped with said buses such as at least an LPC interface bus; and
   said debug card is provided with said buses such as LPC interface buses which are connected to said buses on said carrier board as well as said buses on said COM express board.

3. The Computer-on-Module debug card assembly according to claim 1 wherein both said carrier board and said debug card have a plurality of pilot holes which are opposite to each other and have support pins in between by which said debug card is connected to and situated above said carrier board.

4. The Computer-on-Module debug card assembly according to claim 1 wherein said modular components are CPU, chipset and memory.

5. The Computer-on-Module debug card assembly according to claim 1 wherein said debug card allows its top surface and bottom surface to link said COM express board and said carrier board, respectively.

6. The Computer-on-Module debug card assembly according to claim 1 wherein said debug module is connected to a critical signal switch, an external VGA and an external power supply; and said critical signal switch is used to control said switch buttons on said debug card.

7. The Computer-on-Module debug card assembly according to claim 6 wherein said debug module is further provided with a web-based user interface and a user terminal system.

8. The Computer-on-Module debug card assembly according to claim 7 wherein said web-based user interface enables debug functions via networks of said host which is accessed remotely.

9. The Computer-on-Module debug card assembly according to claim 7 wherein said web-based user interface is provided with a control interface which comprises at least one of interfaces as follows: WEBGUI (WEB Graphic User Interface); firmware interface, host interface, user interface, KVM/VM (Keyboard Video Mouse switch/Visual Media) interface and remote interface control interface.

10. The Computer-on-Module debug card assembly according to claim 7 wherein said user terminal system comprises an identity verification interface on which at least fields like Username and Password are designed.

11. The Computer-on-Module debug card assembly according to claim 10 wherein said fields for Username and Password are used to identify any entered information by said user terminal system prior to accessing debug functions via said web-based user interface.

12. The Computer-on-Module debug card assembly according to claim 9 wherein said WEBGUI comprises at least one of interfaces for network management as follows: network interface, network security interface, security interface, users interface, services interface and IPMI (Intelligent Platform Management Interface).

13. The Computer-on-Module debug card assembly according to claim 9 wherein said firmware interface comprises at least one of interfaces for firmware configurations as follows: sessions interface, LDAP (Lightweight Directory Access Protocol) interface, RADIUS (Remote Authentication Dial in User Service) interface, update interface and utilities interface.

14. The Computer-on-Module debug card assembly according to claim 9 wherein said host interface comprises at least one of interfaces for system information as follows: power interface, thermal interface and system event log interface.

15. The Computer-on-Module debug card assembly according to claim 9 wherein said user interface comprises at least one of interfaces for configurations as follows: platform events interface, trap settings interface, and email settings interface.

16. The Computer-on-Module debug card assembly according to claim 9 wherein said KVM/VM interface is used in configuring Serial Over LAN and comprising at least one function of KVM, VMedia, Launch, and Configuration; and said KVM is used to remotely control said host for debugging; and said VMedia is a USB device from which a debug program is remotely downloaded to said host for debugging.

17. The Computer-on-Module debug card assembly according to claim 9 wherein said remote interface control interface comprises at least one function of remote switch control, remote BIOS select, remote power control and remote hardware/monitor control and said debug module is provided with a BIOS SPI IC (BIOS Serial Peripheral Interface Integrated Circuit).

* * * * *